(12) United States Patent
James

(10) Patent No.: US 8,409,500 B2
(45) Date of Patent: *Apr. 2, 2013

(54) BOTTLE, SYSTEM AND METHOD FOR STERILIZING A LIQUID

(75) Inventor: Eric James, Evanston, IL (US)

(73) Assignee: Neverest Travel Solutions, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,863

(22) Filed: Feb. 28, 2012

(65) Prior Publication Data

US 2012/0152856 A1    Jun. 21, 2012

Related U.S. Application Data

(63) Continuation of application No. 12/462,979, filed on Aug. 12, 2009, now Pat. No. 8,282,880.

(51) Int. Cl.
*A61L 2/00* (2006.01)
*B01J 19/00* (2006.01)
*A61N 5/00* (2006.01)
*B01D 17/08* (2006.01)
*H05F 3/00* (2006.01)
*G08B 17/12* (2006.01)
*B67D 5/58* (2006.01)

(52) U.S. Cl. ............... 422/24; 422/22; 422/23; 422/41; 422/186.3; 422/905; 250/432 R; 250/455.11; 250/492.1; 250/435; 250/436; 210/748.1; 210/748.11; 210/244; 210/117; 210/295; 204/164; 204/660; 204/665; 340/600; 222/190

(58) Field of Classification Search .............. 422/22–24, 422/41, 186.3, 905; 250/432 R, 455.11, 250/492.1, 435–436; 210/748.1, 748.11, 210/244, 117, 192, 295; 204/164, 660, 665; 340/600; 222/190

See application file for complete search history.

(56) References Cited

U.S. PATENT DOCUMENTS

| 6,180,003 B1 * | 1/2001 | Reber et al. ................. 210/198.1 |
| 7,090,779 B2 * | 8/2006 | Bernstein et al. ........ 210/748.11 |
| 7,306,716 B2 * | 12/2007 | Baarman ....................... 210/143 |

* cited by examiner

*Primary Examiner* — Jill Warden
*Assistant Examiner* — Monzer Chorbaji
(74) *Attorney, Agent, or Firm* — Patents+TMS, P.C.

(57) ABSTRACT

A bottle, a system and a method sterilize a liquid. The bottle has an interior to hold the liquid and an ultraviolet light emitting lamp that extends into the interior. A cord may be attached to the bottle so that pulling the cord may power the ultraviolet light emitting lamp and/or charge a battery used to power the ultraviolet light emitting lamp. The bottle may have a status light that indicates that the ultraviolet light emitting lamp may have an amount of power equal to or greater than a threshold value, such as, for example, an amount of power necessary for the ultraviolet light emitting lamp to operate for ninety seconds. The bottle may have a removable lid located opposite to the ultraviolet light emitting lamp.

18 Claims, 3 Drawing Sheets

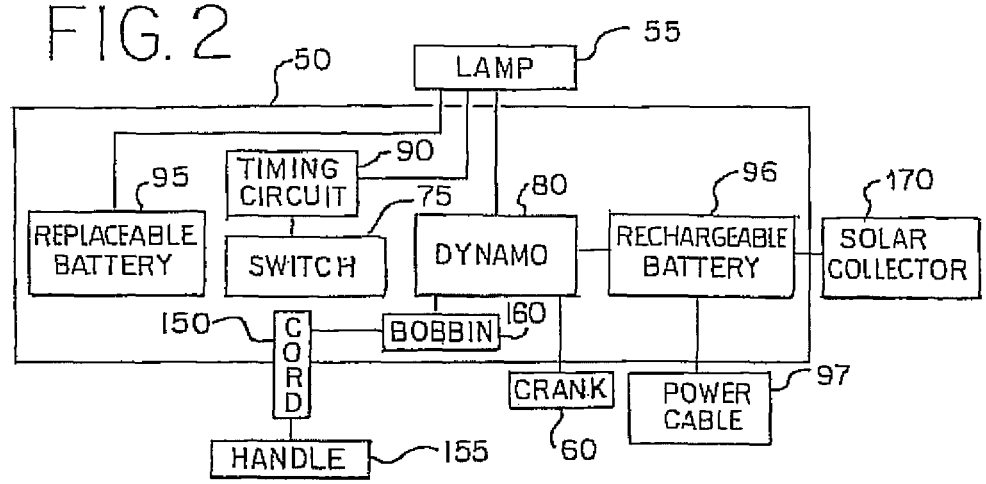
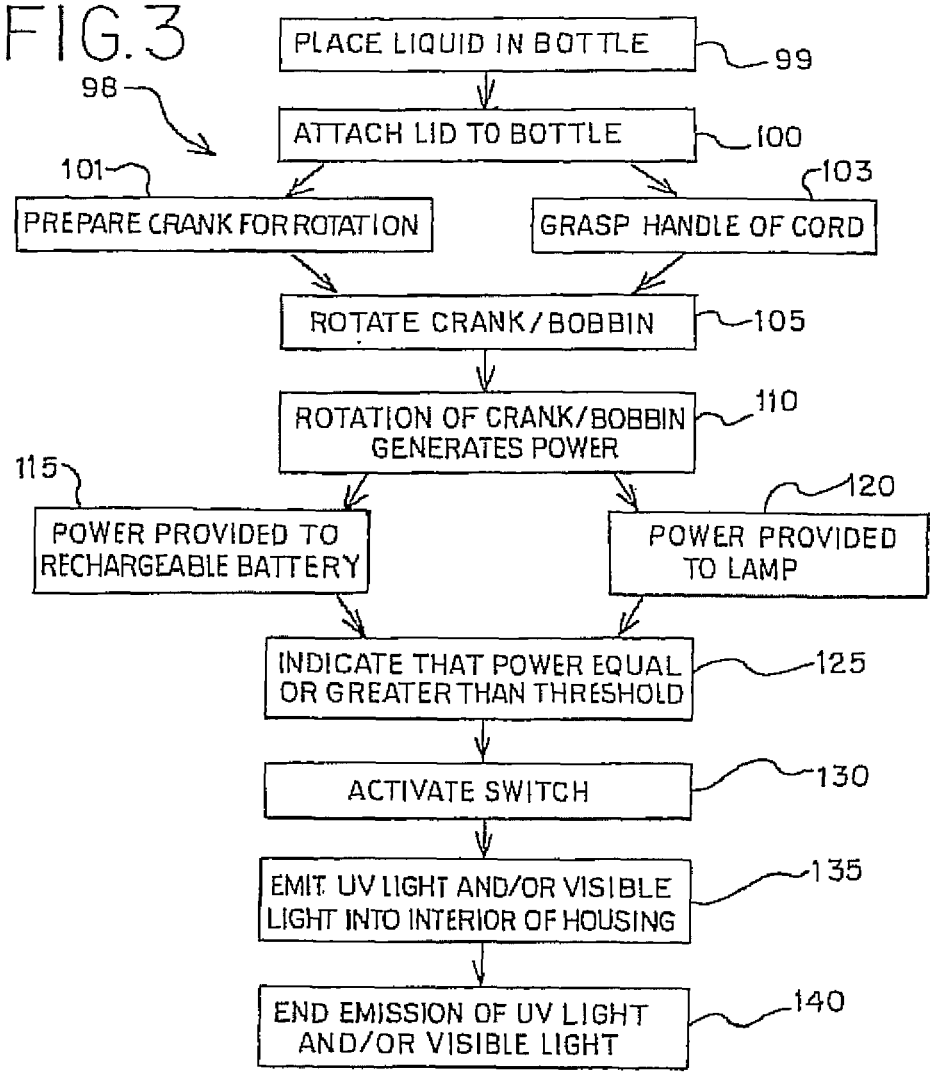

BOTTLE, SYSTEM AND METHOD FOR STERILIZING A LIQUID

This application is a continuation application of U.S. Non-Provisional application Ser. No. 12/462,979, filed Aug. 12, 2009 now U.S. Pat. No. 8,282,880.

BACKGROUND OF THE INVENTION

The present invention generally relates to a bottle, a system and a method for sterilizing a liquid. More specifically, the present invention relates to a bottle having an interior to hold the liquid and a UV light that extends into the interior. The UV light may also emit visible light to indicate functionality of the UV light. A cord may be attached to the bottle so that pulling the cord may power the UV light and/or charge a battery used to power the UV light.

Water may be contaminated by microorganisms, such as, for example, bacteria, protozoa and viruses. Consuming water contaminated by microorganisms may cause cramps, vomiting, diarrhea and/or serious medical problems. For example, death may occur due to medical problems caused by the microorganisms or severe dehydration caused by unavailability of uncontaminated water. Thus, removal of the microorganisms from the water or rendering the microorganisms inactive is desirable.

Sterilization of water is generally known. Most water sterilization systems are designed to remain stationary. Typically, a pump directs water through the system. However, water sterilization may be needed for areas where power is not available, such as, for example, remote locations lacking water treatment facilities. Further, a stationary water sterilization system may not be economically efficient for a sparsely populated area. Moreover, during outdoor activities, sterilization of a relatively small volume of water may be desirable. Chemicals, such as, for example, chlorine, hydrogen peroxide or iodine, or portable filters, such as, for example, a charcoal filter or a ceramic filter, may improve the quality of a relatively small volume of water, but the chemicals and the portable filters are not capable of removing the microorganisms or rendering the microorganisms inactive. In addition, the chemicals may be unhealthy to ingest.

Ultraviolet light may be used to provide a portable water sterilization system. Ultraviolet light is electromagnetic radiation with wavelengths shorter than visible light. Ultraviolet light may enable water sterilization without the use of chemicals or filters. Short range ultraviolet light ("UV-C") having a wavelength of 254 nm is mutagenic to bacteria, viruses and other microorganisms. The UV-C light breaks molecular bonds within the DNA of the microorganisms to produce thymine dimers in the DNA. The thymine dimers kill the microorganism or prevent growth and reproduction.

However, existing portable water sterilization devices that emit UV-C light require an external power source that has a limited duration of use. The external power source may be required to provide energy to a UV-C light emitting means and a pump to direct the water by the UV-C light emitting means. Remote locations throughout the world in need of sterilized water also lack electrical power necessary for existing water sterilization devices. Further, if the portable water sterilization device uses a battery, the device may be inoperable if the battery expires until a new battery is obtained or the battery is recharged.

Therefore, known water sterilization systems are stationary and/or use a battery for energy. Moreover, the known water sterilization systems fail without an external power source.

SUMMARY OF THE INVENTION

The present invention generally relates to a bottle, a system and a method for sterilizing a liquid. More specifically, the present invention relates to a bottle having an interior to hold the liquid and a UV light that extends into the interior. The UV light may also emit visible light to indicate functionality of the UV light. A cord may be attached to the bottle so that mechanical energy created by pulling the cord may power the UV light and/or charge a battery used to power the UV light. The bottle may have a status light that indicates that a time duration of function of the UV light may be sufficient for the liquid to be sterilized. The bottle may have a removable lid located at an end of the bottle opposite to the UV light.

To this end, in an embodiment of the present invention, a bottle for sterilizing a liquid is provided. The bottle has a housing having an interior that holds the liquid wherein the housing has a top end and a bottom end wherein the bottom end is located in a position opposite to the top end and further wherein the housing has an opening located at the top end wherein the opening provides access to the interior; a lid that covers the opening wherein the lid reversibly attaches and de-attaches from the housing; a base connected to the bottom end of the housing wherein the base is located outside of the interior of the housing and further wherein the base has a hole; a lamp connected to the base wherein the lamp extends from the bottom end of the housing within the interior of the housing; a bobbin located in the base that rotates relative to the base; and a cord having a first end and second end located in a position opposite to the first end wherein the second end of the cord is connected to the bobbin and further wherein the cord extends through the hole in the base wherein pulling the first end of the cord rotates the bobbin and further wherein rotation of the bobbin generates energy for the lamp to emit ultraviolet light and visible light.

In an embodiment, the bottle has a status light connected to the base wherein the status light indicates if the energy meets a threshold value.

In an embodiment, the bottle has a switch connected to the base wherein moving the switch from a first position to a second position initiates emission of the ultraviolet light and the visible light by the lamp.

In an embodiment, the bottle has a handle connected to the first end of the cord wherein pulling the handle pulls the first end of the cord to rotate the bobbin.

In an embodiment, the bottle has a battery connected to the base and the lamp.

In an embodiment, a volume of the interior of the housing is approximately one liter.

In another embodiment of the present invention, a system for sterilizing a liquid for a user is provided. The system has a bottle that has an interior that holds the liquid wherein the bottle has a first opening; a lamp connected to the bottle wherein the lamp extends into the interior of the bottle from a position located opposite to the first opening; and a crank connected to the bottle that rotates relative to the bottle wherein rotation of the crank generates energy used by the lamp to emit ultraviolet light into the interior of the bottle.

In an embodiment, the system has a base that connects the crank to the bottle wherein the base is located in a position opposite to the first opening and further wherein the base has a width that is approximately equal to a width of the housing.

In an embodiment, the system has a lid that covers the first opening wherein the lid has a second opening that provides access to the interior of the bottle.

In an embodiment, the lamp emits visible light into the interior of the bottle.

In an embodiment, the system has a status light that emits light to indicate if the energy generated by the crank matches or exceeds a threshold value.

In an embodiment, the crank folds from a first orientation into a second orientation and a length of the crank in the second orientation is less than a width of the bottle.

In an embodiment, the system has a switch connected to the bottle wherein the lamp emits the ultraviolet light in response to movement of the switch.

In another embodiment of the present invention, a method for sterilizing a liquid for a user is provided. The method has the steps of placing the liquid in an interior of a bottle through an opening; connecting a lid to the bottle having the liquid wherein the lid covers the opening; pulling a cord connected to the bottle to generate energy; and emitting ultraviolet light into the interior of the bottle using the energy.

In an embodiment, the method has the step of emitting visible light into the interior of the bottle.

In an embodiment, the method has the step of indicating that the energy generated by the cord exceeds a threshold value.

In an embodiment, the method has the step of recharging a battery connected to the bottle using the energy generated by the cord.

In an embodiment, the method has the step of emitting the ultraviolet light from a lamp connected to the lid wherein the lamp extends from the lid through the opening into the interior of the bottle.

In an embodiment, the method has the step of moving a switch connected to the bottle wherein the ultraviolet light is emitted in response to movement of the switch.

In an embodiment, the method has the steps of indicating that the energy generated by the cord exceeds a threshold value; and moving a switch connected to the bottle wherein emission of the ultraviolet light is responsive to the user moving the switch.

It is, therefore, an advantage of the present invention to provide a bottle, a system and a method for sterilizing a liquid.

Another advantage of the present invention is to provide a bottle, a system and a method for sterilizing a liquid that are not dependent on an external power source.

A still further advantage of the present invention is to provide a bottle, a system and a method for sterilizing a liquid that are easily transported.

Yet another advantage of the present invention is to provide a bottle, a system and a method for sterilizing a liquid that emits ultraviolet light for a predetermined time period.

A further advantage of the present invention is to provide a bottle, a system and a method for sterilizing a liquid that are powered by a pull cord.

Another advantage of the present invention is to provide a bottle, a system and a method for sterilizing a liquid that are powered by a dynamo.

A further advantage of the present invention is to provide a bottle, a system and a method for sterilizing a liquid that use visible light to indicate if a time duration of use of a UV-C lamp may be sufficient for sterilization of the liquid.

Yet another advantage of the present invention is to provide a bottle, a system and a method for sterilizing a liquid that have a crank that may fold.

A further advantage of the present invention is to provide a bottle, a system and a method for sterilizing a liquid that recharge a battery.

Yet another advantage of the present invention is to provide a bottle, a system and a method for sterilizing a liquid that indicate if power was generated to meet a threshold value.

Moreover, an advantage of the present invention is to provide a bottle, a system and a method for sterilizing a liquid that shield a user from UV light.

Additional features and advantages of the present invention are described in, and will be apparent from, the detailed description of the presently preferred embodiments and from the drawings.

BRIEF DESCRIPTION OF THE DRAWINGS

FIG. 2 illustrates a black box diagram of a system for sterilizing a liquid an embodiment of the present invention.

FIG. 3 illustrates a flowchart of a method for sterilizing a liquid in an embodiment of the present invention.

DETAILED DESCRIPTION OF THE PRESENTLY PREFERRED EMBODIMENTS

The present invention generally relates to a bottle, a system and a method for sterilizing a liquid. More specifically, the present invention relates to a bottle having an interior to hold the liquid and a UV light that extends into the interior. The UV light may also emit visible light to indicate functionality of the UV light. A cord may be attached to the bottle so that mechanical energy created by pulling the cord may power the UV light and/or charge a battery used to power the UV light. The cord may be connected to an internal electrical generator located in the bottle. The bottle may have a status light that indicates that the UV light may have an amount of power equal to or greater than a threshold value, such as, for example, an amount of power necessary for the UV lamp to operate for ninety seconds. The bottle may have a removable lid located at an end of the bottle opposite to the UV light.

Figure 1:
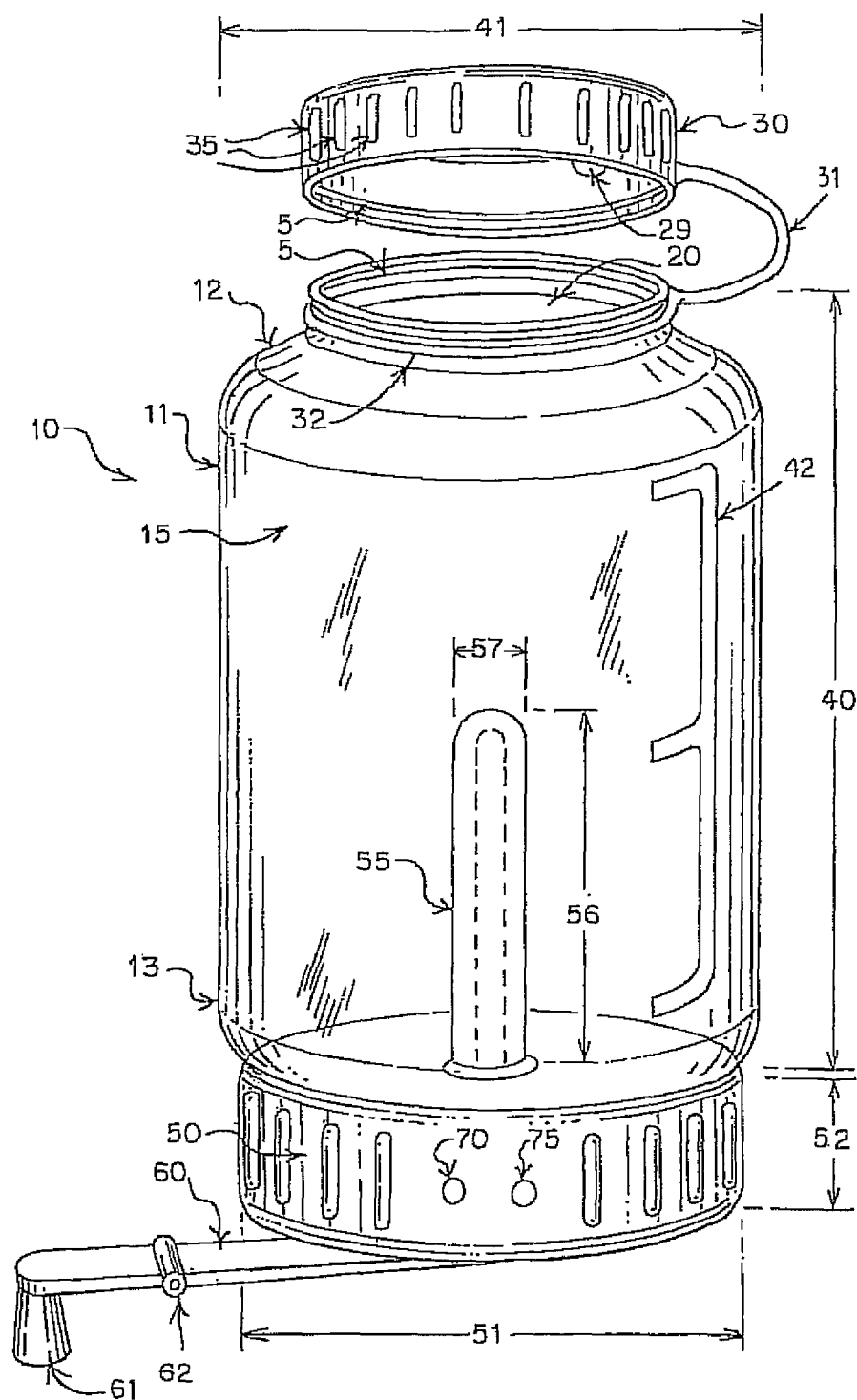
FIG. 1 illustrates a perspective side view of a bottle in an embodiment of the present invention.

Referring now to the drawings wherein like numerals refer to like parts, FIG. 1 illustrates a bottle 10 in an embodiment of the present invention. The bottle 10 may have a housing 11 that may have a top end 12 and/or a bottom end 13 located in a position opposite to the top end 12. The housing 11 may have a first opening 20 located at the top end 12. The housing 11 may have a cylindrical shape, and/or the first opening 20 may be circular. The housing 11 may have an interior 15, and/or the first opening 20 may provide access to the interior 15.

The bottle 10 may have a lid 30 that may connect to the housing 11 to cover and/or seal the first opening 20. For example, the lid 30 may connect to the housing 11 with grooves 5 that may be formed in the lid 30 and/or that may be connected to the housing 11. The lid 30 may connect to the housing 11 using a lanyard 31. The lanyard 30 may be connected to the housing 11 by a collar 32 that may be connected to the top end 12 of the housing 11. The lid 30 may have vertical ridges 35 that may assist a user in turning the lid 30 to remove the lid 30 from the housing 11 to obtain access to the first opening 20. The lid 30 may have a second opening 29 that may enable the user to access the first opening 20 without removing the lid 30 from the housing 11. The lid 30 and/or the housing 11 may shield the user from ultraviolet light emitted into the interior 15 of the housing 11 as discussed in more detail hereafter.

The housing 11 may be manufactured and/or constructed from plastic, such as, for example, polypropylene, high-density polyethylene, low-density polyethylene and/or the like. In an embodiment, the housing 11 may not have bisphenol A.

The housing 11 may be translucent and/or partially opaque such that the user may view the interior 15 of the housing 11. The housing 11 may be more rigid relative to the lanyard 31, and/or the lanyard 31 may be flexible. The lid 30 may be removed from the opening 20 while the lanyard 31 and/or the collar 32 maintain connection of the lid 30 to the housing 11. In an embodiment, the housing 11 and/or the bottle 10 may be resistant to impact and/or staining and/or may be washed in a standard dishwasher. The present invention is not limited to a specific embodiment of a material of the housing 11 and/or the lanyard 31.

A volume of the interior 15 of the housing 11 may be any volume. In an embodiment, the volume of the interior 15 of the housing 11 is approximately two liters or less. For example, in an embodiment, the volume of the interior 15 is approximately two liters. In another embodiment, the volume of the interior 15 of the housing 11 is approximately one liter or less. For example, in an embodiment, the volume of the interior 15 is approximately 750 milliliters. In a preferred embodiment, the volume of the interior 15 of the housing 11 is approximately one liter. A height 40 and/or a width 41 of the housing 11 may be any height and/or any width, respectively. In an embodiment, the height 40 of the housing 11 is approximately ten inches or less, and/or the width 41 of the housing is approximately four inches or less. In a preferred embodiment, the height 40 is nine inches and/or the width 41 is 3.5 inches. The housing 11 may have markings 42 that may indicate a volume of liquid located in the interior 15 of the housing 11. The present invention is not limited to a specific volume, height or the width of the housing 11. The volume, the height 40 and the width 41 may be any value.

A base 50 may be connected to the bottom end 13 of the housing 11. The base 50 may have a cylindrical shape, and/or the base 50 may have a width 51 that may be approximately equal to the width 41 of the housing 11. A height 52 of the base 50 may be any height. In an embodiment, the height 52 of the base 50 is approximately two inches or less. In a preferred embodiment, the height 52 of the base 50 is 1.5 inches. The present invention is not limited to a specific embodiment of a shape of the base 50, a specific width or a specific height. The shape of the base 50 may be any shape, and the width 51 and the height 52 of the base 52 may be any value.

A lamp 55 may extend from the base 50 and/or the bottom end 13 of the housing 11 into the interior 15 of the housing 11. Alternatively, the lamp 55 may extend from the lid 30 into the interior 15 of the housing 11. For example, in an embodiment, the lamp 55 may extend from the lid 30 through the first opening 20 into the interior 15 of the housing 11 if the lid 30 is connected to the housing 11. The lamp 55 may emit ultraviolet light, such as, for example, light having a wavelength between 200 nm and 300 nm. In an preferred embodiment, the wavelength of the ultraviolet light may be approximately 254 nm. The volume of the interior 15 of the housing 11 may enable the liquid in the interior 15 to be irradiated by the ultraviolet light. The lamp may be a mercury vapor lamp, such as, for example, a low-pressure UV lamp, an amalgam UV lamp, a medium-pressure UV lamp, an electrode-powered UV lamp, a microwave-powered UV lamp and/or the like. The lamp 55 may have a quartz casing (not shown). The lamp 55 may emit visible light, such as, for example, light having a wavelength between 380 nm to 750 nm. For example, the lamp 55 may have one or more ultraviolet light emitting diodes and/or one or more visible light emitting diodes. In an embodiment, the lamp 55 may provide 8,000 uses, and each of the uses is an approximately ninety second time period of ultraviolet light emission. The present invention is not limited to a specific embodiment of the lamp 55, and the lamp 55 may be any lamp that may emit the ultraviolet light and/or the visible light.

The lamp 55 may have a length 56 and/or a width 57. Preferably, the length 56 may be three inches or less, and/or the width 57 may be an inch or less. In a preferred embodiment, the length 56 is approximately 2.5 inches, and/or the width 57 is approximately twelve millimeters. The present invention is not limited to a specific embodiment of the length 56 or the width 57.

A crank 60 may be connected to the base 50 such that the crank 60 may rotate relative to the base 50 and/or the housing 11. The crank 60 may be an arm, a lever, a handle and/or the like. The crank 60 may have a knob 61 to assist the user in grasping the crank 60. Rotation of the crank 60 may provide power to the lamp 55 as discussed in more detail hereafter. The crank 60 may fold into a compact orientation such that the crank 60 may not extend from the base 50 if the crank 60 has the compact orientation. For example, the crank 60 may have a hinge that may enable the crank 60 to fold into the compact orientation. As a further example, the crank 60 in the compact orientation may have a length that may be approximately equal to or less than the width 41 of the housing 11 and/or the width 51 of the base 11. The present invention is not limited to a specific embodiment of the crank 60, and the crank 60 may be any component of the bottle 10 that may be enable user action to provide power for the lamp 55.

Figure 4:
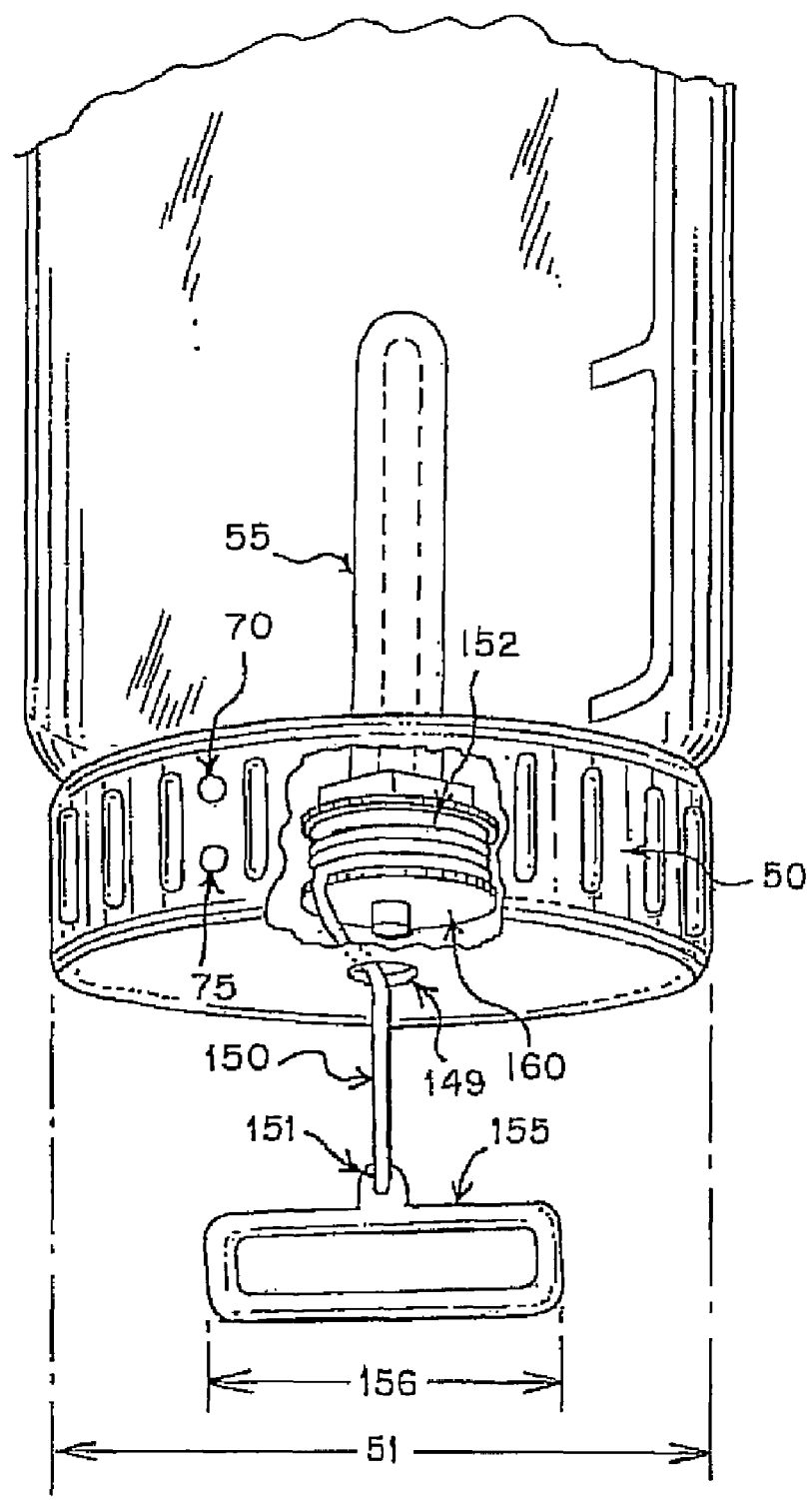
FIG. 4 illustrates a perspective side view of a bottle in an embodiment of the present invention.

As generally illustrated in FIG. 4, a cord 150 may be connected to the base 50 such that the cord 150 may extend from the base 50 and/or the housing 11. For example, the base 50 may have an opening 149 from which the cord 150 may extend. The cord 150 may have a first end 151 and/or a second end 152 located in a position opposite to the first end 151. A handle 155 may be connected to the first end 151 of the cord 150 to assist the user in grasping and/or pulling the cord 150. The opening 149 may be located between the first end 151 of the cord 150 and the second end 152 of the cord 150. The handle 155 may have a width 156 that may be any width. In an embodiment, the width 156 of the handle 155 may be approximately equal to the width 51 of the base 50 so that the handle 155 may not extend from the base 50 if the handle 155 and/or the cord 150 are not in use. In another embodiment, the width 156 of the handle 155 may be less than the width 51 of the base 50 so that the handle 155 may not extend from the base 50 if the handle 155 and/or the cord 150 are not in use. The present invention is not limited to a specific embodiment of the cord 150 or the handle 151. Further, the present invention is not limited to a specific location of the cord 150. FIG. 4 depicts the cord 150 extending from a bottom of the base 50, but the cord 150 may extend from any location on the bottle 10 and/or the base 50. For example, the cord 150 may extend from a side of the base 50.

The second end 152 of the cord 150 may be connected to a bobbin 160. The bobbin 160 may be connected to the base 50 and/or the housing 11. For example, the bobbin 160 may be located inside of the base 50. The bobbin 160 may be, for example, a spindle, a cylinder, a rod and/or the like. The bobbin 160 may rotate relative to the base 50 and/or the housing 11. The cord 150 may wind around the bobbin 160 so that pulling the cord 150 may unwind the cord 150 from the bobbin 160 and/or may rotate the bobbin 160. The bobbin 160 may have a spring (not shown) that may compress during unwinding of the cord 150 so that the spring may decompress after unwinding the cord 150 to rotate the bobbin 160 in an opposite direction. Rotating the bobbin 160 in the opposite direction may rewind the cord 150 around the bobbin 160. Pulling the cord 150 and/or rotating the bobbin 160 may provide power to the lamp 55 as discussed in more detail hereafter. The present invention is not limited to a specific embodiment of the bobbin 160.

In an embodiment, an additional cord (not shown) may rewind the cord 150 around the bobbin 160. For example, the additional cord may be wound around the bobbin 160 such that unwinding of the cord 150 may cause winding of the additional cord around the bobbin 160. Unwinding of the additional cord may cause winding of the cord 150 around the bobbin 160. Thus, the user may alternate pulling the cord 150 and pulling the additional cord. In an embodiment, the cord 150 and the additional cord may be formed by one cord. The one cord may have a first end and a second end, and/or the one cord may be attached to the bobbin 160 at the approximate midpoint between the first end and the second of the one cord. A first portion of the one cord between the approximate midpoint and the first end may form the cord 150, and/or a second portion of the one cord located between the approximate midpoint and the second end may form the additional cord.

Referring to FIGS. 1 and 4, the bottle 10 may have a status light 70 that may be connected to the base 50. In an embodiment, the status light 70 may be a single light emitting diode. The status light 70 may indicate if an amount of power generated is equal to or greater than a threshold value. For example, the threshold value may be the amount of power necessary for the lamp 55 to emit the ultraviolet light and/or the visible light for a predetermined time period, such as, for example, ninety seconds. The status light 70 may emit a first color of light if the amount of power generated is less than the threshold value, and/or the status light 70 may emit a second color of light that may be a different color than the first color if the amount of power generated is equal to or greater than the threshold value.

For example, the status light 70 may emit red light if the amount of power generated is less than the threshold value, and/or the status light 70 may emit green light if the amount of power generated is equal to or greater than the threshold value. As a further example, the status light 70 may not emit light if the amount of power generated is less than the threshold value, and/or the status light 70 may emit light if the amount of power generated is equal to or greater than the threshold value.

The bottle 10 may use audio signals to indicate if the amount of power generated is equal to or greater than the threshold value. For example, the base 50 may emit a sound if the amount of power generated is equal to or greater than the threshold value. The base 50 may emit the sound after the rotation of the crank 60 has generated the amount of power necessary for the lamp 55 to emit the ultraviolet light and/or the visible light for the predetermined time period.

The bottle 10 may have a switch 75 that may be connected to the base 50. The lamp 55 may emit the ultraviolet light and/or the visible light in response to activation of the switch 75, such as, for example, the user moving the switch 75 from a first position to a second position. In an embodiment, activation of the switch 75 may initiate emission of the ultraviolet light and/or the visible light by the lamp 55 if the status light 70 indicates that the amount of power generated is equal to or greater than a threshold value. For example, in an embodiment, the lamp 55 may not initiate emission of the ultraviolet light and/or the visible light until activation of the switch 75 after the status light 70 indicates that the amount of power generated is equal to or greater than the threshold value. For example, activation of the switch 75 may initiate emission of the ultraviolet light and/or the visible light by the lamp 55 if the status light 70 emits green light. In an embodiment, the status light 70 may cease emitting light after activation of the switch 75. The switch 75 may be, for example, a button that may be pressed, a lever that may be moved and/or any means known to one having ordinary skill in the art to initiate emission of the ultraviolet light and/or the visible light by the lamp 55.

In an embodiment, the bottle 10 may not have the switch 75. For example, the lamp 55 may emit the ultraviolet light and/or the visible light automatically in response to determination that the rotation of the crank 60 generated an amount of power equal to or greater than a threshold value. In an embodiment, the ultraviolet light may be emitted at an intensity of at least fifteen $mJ/cm^2$. In another embodiment, the ultraviolet light may be emitted at an intensity of at least twenty $mJ/cm^2$. In a preferred embodiment, the ultraviolet light may be emitted at an intensity of at least twenty-five $mJ/cm^2$.

As generally illustrated in FIG. 2, the crank 60, the bobbin 160 and/or the lamp 55 may be connected to a dynamo 80 that may be located in the base 50. As known to one having ordinary skill in the art, a dynamo may generate current using an armature which rotates within a magnetic field, and a dynamo may have a stationary structure which may provide the magnetic field. Rotation of the crank 60 and/or the bobbin 160 may generate power for the lamp 55 using the dynamo 80. For example, the dynamo 80 and/or the armature of the dynamo 80 may be mechanically coupled to the bobbin 160 and/or the crank 60. Examples of the cord 150, the bobbin 160 and the dynamo 180 that may be used in the present invention are disclosed in U.S. Patent App. Pub. Nos. 2008/0150378, 2008/0150493, 2008/0150495, 2008/0157531, 2008/0157536, 2008/0157615, and 2008/0157635 assigned to Potenco, Inc., herein incorporated by reference in their entirety. The present invention is not limited to specific embodiment of the dynamo 80.

A circuit 90 may be connected to the lamp 55 to control a time period of emission of the ultraviolet light and/or the visible light by the lamp 55. For example, the circuit 90 may end emission of the ultraviolet light and/or the visible light by the lamp 55 if the time period of emission reaches a predetermined value, such as, for example, ninety seconds. For example, the circuit 90 may prevent the lamp 55 from receiving additional power if the time period of emission matches the predetermined value. The circuit 90 may automatically end emission of the ultraviolet light and/or the visible light by the lamp 55 if the time period of emission reaches the predetermined value such that user input may not be needed to end the emission. For example, after the user moves the switch 75 at a first time to initiate emission, the user may not need to activate the switch 75 at a second time to end the emission. If the lamp 55 stops emitting the visible light after the time period of emission reaches the predetermined value, the user may be informed that the liquid may be sterilized by the ultraviolet light by viewing that emission of the visible light ended.

In an embodiment, the bottle 10 may have one or more replaceable batteries 95 that may be inserted in the base 50 and/or may connect to the lamp 55. The one or more replaceable batteries 95 may be, for example, a lithium battery, a nickel metal hydride battery, an alkaline battery and/or the like. In a preferred embodiment, the one or more replaceable batteries 95 may be four "AA" size batteries as known to one having ordinary skill in the art. In an embodiment, the one or more replaceable batteries 95 may provide power to the lamp 55 if the crank 60, the cord 150 and/or the dynamo 80 fail. In an embodiment, the crank 60, the cord 150 and/or the dynamo 80 may provide power to the lamp 55 if the one or more replaceable batteries 95 fail. The one or more replaceable batteries may be removed from the base 50, and/or one or more new replaceable batteries may be inserted into the base 50. The one or more replaceable batteries 95 may have an output of at least 2300 milliamp hours (mAh) to power the lamp 55. The present invention is not limited to a specific embodiment or a specific quantity of the one or more replaceable batteries 95.

In an embodiment, the bottle 10 may have one or more rechargeable batteries 96 that may be located inside the base 50 and/or may connect to the lamp 50. The one or more rechargeable batteries 96 may be, for example, a lithium battery, a nickel metal hydride battery and/or the like. The one or more rechargeable batteries 96 may be connected to a power cable 97 that may be connected to an electrical outlet to recharge the one or more rechargeable batteries 96. The one or more rechargeable batteries 96 may be recharged by the dynamo 80 and/or the rotation of the crank 60 and/or the bobbin 160. In an embodiment, the one or more rechargeable batteries 96 may provide power to the lamp 55 if the crank 60, the cord 150 and/or the dynamo 80 fail. In an embodiment, the crank 60, the cord 150 and/or the dynamo 80 may provide power to the lamp 55 if the one or more rechargeable batteries 96 fail. The one or more rechargeable batteries 96 may have an output of at least milliamp hours (mAh) to power the lamp 55. The present invention is not limited to a specific embodiment or a specific quantity of the rechargeable battery 96.

In an embodiment, the base 50 and/or the housing 11 may be connected to a solar collector 170. The solar collector 170 may be connected to the one or more rechargeable batteries 96, and/or the solar collector 170 may recharge the one or more rechargeable batteries 96. The solar collector 170 may use light energy from the sun to generate electricity that may be used to recharge the one or more rechargeable batteries 96. The solar collector 170 may have photovoltaic cells (not shown) that capture the light energy. The present invention is not limited to a specific embodiment of the solar collector 170, and the solar collector 170 may be any solar collector that uses the light energy to recharge the one or more rechargeable batteries 96.

FIG. 3 generally illustrates a method 98 for sterilizing a liquid. As shown at step 99, the user may place the liquid into the bottle 10, such as, for example, by pouring the liquid into the first opening 20 of the housing 11. As shown at step 100, the user may connect the lid 30 to the bottle 10 and/or the housing 11. For example, the user may use the grooves 5 to connect the lid 30 to the housing 11.

As shown at step 101, the user may prepare the crank 60 for rotation, such as, for example, by unfolding the crank 60 from the base 50 using the hinge 62 of the crank 60. Alternatively, as shown at step 103, the user may prepare to pull the cord 150, such as, for example, by grasping the cord 150 and/or the handle 155. As shown at step 105, the user may rotate the crank 60 and/or the bobbin 160. For example, the user may rotate the crank 60 relative to the base 50. Alternatively, the user may rotate the bobbin 160 by pulling the cord 150 and/or the handle 155. As shown at step 110, rotation of the crank 60 and/or the bobbin 160 may generate power using the dynamo 80. As shown at step 115, in an embodiment having the rechargeable battery 96, the dynamo 80 may provide the power to the rechargeable battery 96. As shown at step 120, the dynamo 80 may provide power to the lamp 55. For example, the dynamo 80 may directly provide power to the lamp 55. An indication may be provided that identifies that an amount of power equal to or greater than the threshold value was generated, as shown at step 125. For example, the status light may 70 indicate that the rotation of the crank 60 generated an amount of power equal to or greater than the threshold value. As shown at step 130, the user may activate the switch 75, such as, for example, by moving the switch 75 from a first position to a second position.

As generally shown at step 135, the ultraviolet light and/or the visible light may be emitted into the interior 15 of the housing 11 in response to activation of the switch 75 and/or indication that the rotation of the crank 60 generated an amount of power equal to or greater than the threshold value. For example, the lamp 55 may emit the ultraviolet light and/or the visible light. As generally shown at step 140, the circuit 90 may end emission of the ultraviolet light and/or the visible light if the time period of emission reaches the predetermined value, such as, for example, ninety seconds. For example, the circuit 90 may automatically end the emission of the ultraviolet light and/or the visible light if the time period of emission reaches the predetermined value.

It should be understood that various changes and modifications to the presently preferred embodiments described herein will be apparent to those skilled in the art. Such changes and modifications may be made without departing from the spirit and scope of the present invention and without diminishing its attendant advantages.

I claim:

1. A bottle for sterilizing a liquid, the bottle comprising:
a housing having an interior that holds the liquid wherein the housing has a top end and a bottom end wherein the bottom end is located in a position opposite to the top end and further wherein the housing has an opening located at the top end wherein the opening provides access to the interior;
a lid that covers the opening wherein the lid reversibly attaches and de-attaches from the housing;
a base connected to the housing wherein the base is located outside of the interior of the housing;
a lamp connected to the base wherein the lamp has walls and the walls extend into the liquid in the interior of the housing;
a rotatable means for generating energy to power the lamp located in the base that rotates relative to the base wherein rotation of the rotatable means generates energy for the lamp to emit ultraviolet light;
a status light that indicates if the energy generated by the rotatable means matches or exceeds a threshold value; and
a switch connected to the base wherein the lamp emits the ultraviolet light in response to movement of the switch when the status light indicates that the energy generated by the rotatable means matches or exceeds the threshold value.

2. The bottle of claim 1 further comprising:
a crank connected to the base wherein rotation of the crank rotates the rotatable means.

3. The bottle of claim 1 wherein the status light is connected to the base.

4. The bottle from claim 1 wherein the ultraviolet light has a wavelength of approximately 254 nm.

5. The bottle of claim 1 further comprising:
a circuit connected to the lamp wherein the circuit ends emission of the ultraviolet light if a time period of emission reaches a predetermined value.

6. The bottle of claim 1 wherein the status light emits a first color of light to indicate that the energy generated by the crank does not match or exceed the threshold value and emits a second color of light to indicate that the energy generated by the crank matches or exceeds the threshold value.

7. The bottle of claim 1 further comprising:
a battery positioned within the base and connected to the lamp.

8. The bottle of claim 1 further comprising:
a dynamo to which the rotatable means is connected.

9. The bottle of claim 1 wherein the lamp emits visible light and the ultraviolet light in response to movement of the switch when the status light indicates that the energy generated by the crank matches or exceeds the threshold value.

10. An apparatus for sterilizing a liquid in an interior of a bottle, the apparatus comprising:
   a lamp having a body defined by walls wherein the body of the lamp inserts into the liquid in the interior of the bottle;
   a base to which the lamp is connected;
   a crank connected to the base wherein the crank rotates relative to the base to generate energy used by the lamp to emit ultraviolet light through the walls of the lamp and a status light that visually indicates if the energy generated the crank matches or exceeds a threshold value.

11. The apparatus of claim 10 wherein the lamp inserts through an opening at one end of the bottle into the interior of the bottle.

12. The apparatus of claim 10 further comprising:
a circuit positioned within the base and connected to the lamp wherein the circuit determines when a time period of emission reaches a predetermined value.

13. The apparatus of claim 10 further comprising:
a status light that emits a first color of light to indicate that the energy generated by the crank does not match or exceed a threshold value and emits a second color of light to indicate that the energy generated by the crank matches or exceeds the threshold value.

14. A method for sterilizing a liquid in an interior of a bottle, the method comprising the steps of:
   placing the liquid in the interior of the bottle through an opening;
   connecting the bottle to a base wherein connection of the bottle to the base inserts a lamp connected to the base into the liquid in the interior of the bottle; and
   rotating a crank connected to the base to generate energy; and
   activating the lamp from the energy to emit ultraviolet light from the lamp to the liquid in the interior of the bottle; and providing a status light that visually indicates when the energy generated by the crank is sufficient to operate the ultraviolet light.

15. The method of claim 14 further comprising the steps of:
   emitting a first color of light to indicate that the energy generated by the crank does not match or exceed a threshold value; and
   emitting a second color of light to indicate that the energy generated by the crank matches or exceeds the threshold value.

16. The method of claim 14 wherein connecting the bottle to the base positions the lamp to extend from the base through the opening into the interior of the bottle.

17. The method of claim 14 further comprising the step of:
determining when a time period of emission of the ultraviolet light reaches a predetermined value.

18. The method of claim 14 further comprising the step of:
visually indicating that the time period of emission of the ultraviolet light reached the predetermined value.

\* \* \* \* \*